UNITED STATES PATENT OFFICE.

MATHIAS POULSEN, OF KÖBENHAVEN, DENMARK.

TAR-PAPER.

1,203,405.  Specification of Letters Patent.  Patented Oct. 31, 1916.

No Drawing. Substitute for application Serial No. 386,765, filed August 2, 1907. This application filed May 19, 1916. Serial No. 98,702.

*To all whom it may concern:*

Be it known that I, MATHIAS POULSEN, a subject of the King of Denmark, residing at Köbenhaven, in the Kingdom of Denmark, have invented certain new and useful Improvements in Tar-Paper; and I do hereby declare the following to be a full, clear, and exact description of the invention, such as will enable others skilled in the art to which it appertains to make and use the same.

This invention relates to tar paper and has for its object to provide an article of that nature and a process of preparing it that will result in a paper of greater durability and flexibility; which will be less affected by rain and which will have greater strength than the ordinary tar paper.

More especially the invention relates to the subject-matter of my prior application filed June 16—1905 and bearing the Serial No. 265,628 which was allowed Oct. 25—1906, and becoming forfeited, was renewed August 2—1907 under the Serial No. 386,765, said renewal being allowed August 21—1907 and becoming abandoned.

The class of tar paper to which this invention relates is usually made by coating felt paper with tar at a temperature of 72 degrees Fahrenheit, the tar having mixed therewith sand. The objection to such tar paper is that it is rather brittle so that it is readily cracked while its roughened surface holds moisture. Furthermore, its brittleness increases as its temperature is reduced.

In manufacturing tar paper in accordance with the present invention the ordinary process is followed with exception that in place of sand there is employed a mixture of pine and beech saw dust, the latter being obtained preferably from the Danish species of that tree, *i. e.*, Boge-tree. Owing to the use of the saw dust and tar alone, a much more flexible coating is obtained, and the liability of the coating to become brittle and crack is therefore greatly decreased, while its glossy or polished appearance is, in consequence, practically permanent. There is, furthermore, no tendency of the coating to retain moisture, as is the case where the sand appears as an element with the effect of causing the roughened surface, the moisture such as rainwater or the like collecting in the depressions of the roughened surface.

The proportions of the pine and beech saw dust are not fixed with relation to each other and the pine saw dust may, however, be entirely omitted.

It is found that tar paper made as above described is practically unaffected by storm and rain because of its smoothness, the surface of the mixture of tar and saw dust or of the coating of the paper, being smooth. Furthermore, the leather-like character of the coating gives to the article a toughness and strength not possessed by the ordinary tar paper in which sand forms a part.

What I claim is:—

An article of the class described comprising a base and a coating therefor, said coating consisting solely of tar and a mixture of beech and pine saw dust.

In testimony whereof, I affix my signature.

MATHIAS POULSEN.